(No Model.) 7 Sheets—Sheet 1.

E. P. WAGGONER.
SECTIONAL HEATER.

No. 474,311. Patented May 3, 1892.

WITNESSES:
H. E. Chase,
W. H. Randall.

INVENTOR
Edward P. Waggoner
BY
Hey Wilkinson Parsons
ATTORNEYS.

(No Model.) 7 Sheets—Sheet 3.

E. P. WAGGONER.
SECTIONAL HEATER.

No. 474,311. Patented May 3, 1892.

WITNESSES:
W. H. Randall
H. E. Chase

INVENTOR
Edward P. Waggoner
BY
Hey Wilkinson Parsons
ATTORNEYS.

(No Model.)  E. P. WAGGONER.  7 Sheets—Sheet 4.
SECTIONAL HEATER.

No. 474,311.  Patented May 3, 1892.

WITNESSES:  
H. E. Chase,  
W. H. Randall.

INVENTOR  
Edward P. Waggoner  
BY  
Wilkinson & Parsons  
ATTORNEYS.

(No Model.) 7 Sheets—Sheet 5.

E. P. WAGGONER.
SECTIONAL HEATER.

No. 474,311. Patented May 3, 1892.

WITNESSES:
H. E. Chase,
W. H. Randall.

INVENTOR
Edward P. Waggoner
BY
Hey Wilkinson Parsons
ATTORNEYS.

(No Model.) 7 Sheets—Sheet 6.
E. P. WAGGONER.
SECTIONAL HEATER.

No. 474,311. Patented May 3, 1892.

WITNESSES:

INVENTOR
Edward P. Waggoner
BY
ATTORNEYS.

UNITED STATES PATENT OFFICE.

EDWARD P. WAGGONER, OF SYRACUSE, NEW YORK, ASSIGNOR OF ONE-HALF TO THE PIERCE, BUTLER & PIERCE MANUFACTURING COMPANY, OF SAME PLACE.

SECTIONAL HEATER.

SPECIFICATION forming part of Letters Patent No. 474,311, dated May 3, 1892.

Application filed October 6, 1891. Serial No. 407,904. (No model.)

*To all whom it may concern:*

Be it known that I, EDWARD P. WAGGONER, of Syracuse, in the county of Onondaga, in the State of New York, have invented new and useful Improvements in Sectional Heaters, of which the following, taken in connection with the accompanying drawings, is a full, clear, and exact description.

My invention relates to improvements in sectional heaters, and has for its object the production of a simple and effective device which is economically shipped, easily and readily placed in operative position, and is extremely effective and durable in use and operation.

To this end the invention consists, essentially, in a water-containing section composed of separate divisions, a connecting-pipe system between the separate divisions for passing the water from one to the other, an upper section having projecting heating-chambers on its vertical wall extending beyond the wall of the lower section, a steam-drum also composed of separate divisions, a connecting-pipe system between the divisions of the steam-drum for equalizing the pressure of the steam, and water-circulating passages between the corresponding divisions of the separate heater-sections.

The invention also consists in a section composed of like halves lying at one side of each other, each half being formed of separate divisions, separate connecting-pipe systems between the respective divisions of the separate section-halves for passing the water from one division to the other, a main connecting-pipe between said pipe systems for passing the water from one section-half to the other, a steam-drum section also composed of halves formed of separate divisions, separate steam-connecting-pipe systems between the divisions of the respective steam-drum halves, a main connecting-pipe between the said steam-connecting-pipe systems for equalizing the pressure in the respective section-halves of the steam-drum, circulating-passages between the water-containing section and the steam-drum section, and in the detail construction and arrangement of the parts, all as hereinafter more particularly described, and pointed out in the claims.

In describing my invention reference is had to the accompanying drawings, forming a part of this specification, in which like letters indicate corresponding parts in all the views.

Fig. 5 is a top plan view of the water-section shown at Fig. 3, the connecting-pipes between the divisions of its respective halves and the main connecting-pipe between the aforesaid connecting-pipes for passing the water from one section-half to the other being shown as operatively connected to said section. Fig. 6 is a top plan view, one-half being shown in section, of one of the sections forming the fire-box. Fig. 7 is a longitudinal vertical sectional view taken on line 7 7, Fig. 6.

The sections of heaters formed of horizontal sections imposed one above the other are when the heater is of sufficient capacity to heat a comparatively large building extremely unwieldy and heavy, necessitating great labor and time when assembling of the heater in the building, since such heaters are usually shipped in a "knockdown" condition and are afterward assembled in the building or its cellar. Moreover, when the heaters are of sufficient size to heat an extremely-large building, as a flat, block, or large hall, the separate sections composing the heater are oftentimes so large and unwieldy that the heater must be either placed in position before the building is completed or else a special opening, as an unusually-large door, must be cut in the building to permit the passage of the respective sections. To obviate this difficulty, and also for the purpose of permitting the production of a large or small fire when the weather is cold or mild, the sections of heaters of this extremely-large size have been composed of corresponding halves; but even when so constructed great difficulty is experienced in entering the halves within the building, and there is more or less difficulty in the operation of such heaters as the cold-water and steam-outlet pipes at present used therewith do not equalize the circulation of water in the corresponding halves of the water-containing section nor the pressure of the steam in both halves of the steam-drum section.

My improved heater is designed to be readily and easily shipped and to be placed in position with a minimum amount of labor and time and is so constructed as to equalize the circulation of water and the pressure of steam in the corresponding section-halves. With these objects in view each section is composed of separate halves, each half being constructed of separate divisions. The divisions of each half of one of the water-containing sections and the steam-drum section are connected by separate pipe and the respective connecting-pipe systems of said separate section-halves are connected by main connecting-pipes, whereby the circulation of water and the pressure of the steam is equalized in the halves of the respective heater-sections.

A represents the lower cold-water-receiving section of my improved heater; C C', the next superimposed heating-sections, forming, in connection with the lower section, the fire-box D; E E', the main water-heating sections, having projecting heating chambers or corrugations $e$, and F the steam-drum section.

The lower section A is supported on a suitable base G, subdivided into two chambers by a partition $g$ for forming a pair of separate ash-boxes H H', above which, and directly beneath the section A, are mounted suitable grates I I'. Above the base G and inclosing the heater-sections is an outer casing J, formed of suitable material.

The base G forms no essential feature of my invention, and its construction is immaterial, since it may be built of brick or may be composed of a casting formed of a single piece or of several sections suitably united together.

The outer casing J is preferably of sheet metal, and may in transportation be formed into a roll; but if formed of cast metal may also be composed of sections suitably secured together.

Figure 1:
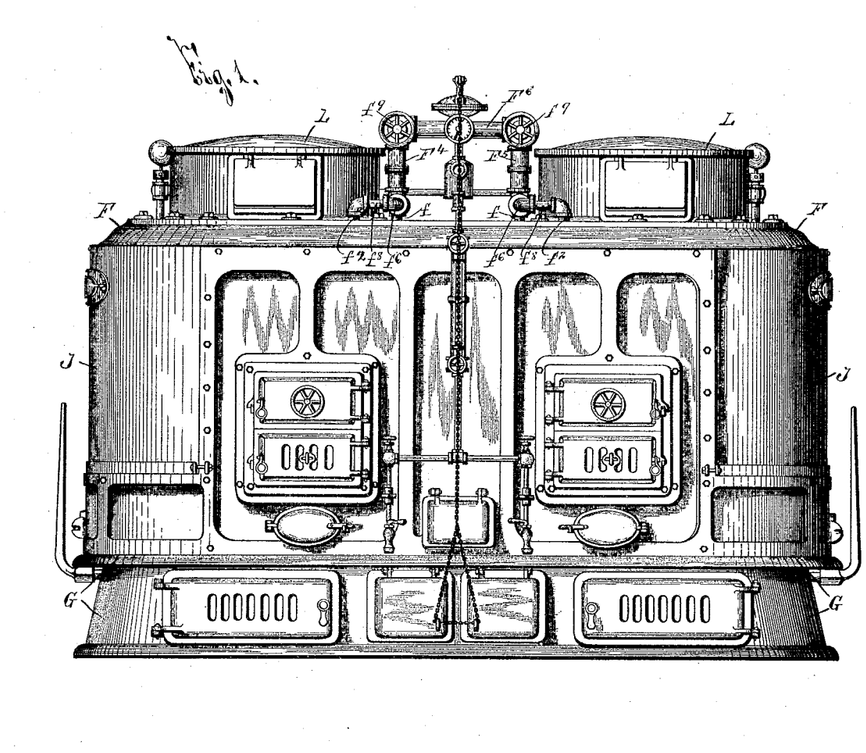
Figure 1 represents a front elevation of my heater.
Figure 2:
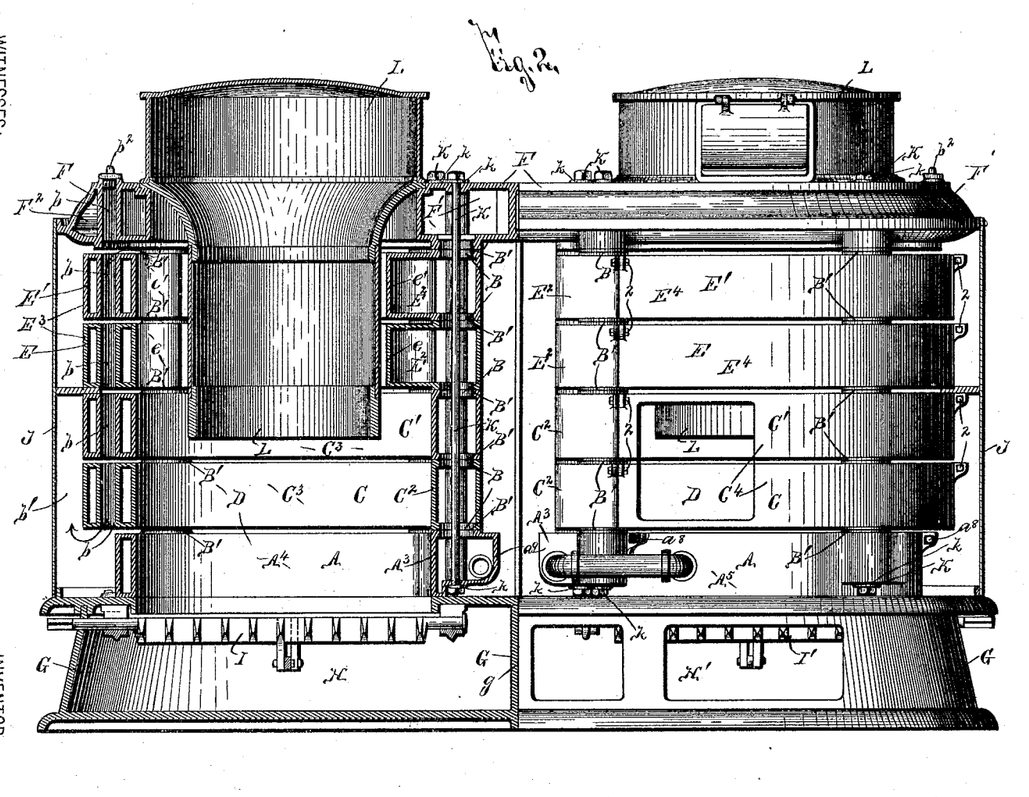
Fig. 2 is a longitudinal sectional view showing the corresponding section-halves in elevation at the right hand and in section at the left hand.

The sections A, C, C', E, E', and F are, as best seen at Fig. 2, arranged one above the other and are provided with circulating-passages B, consisting of openings in the respective shells of said section, aligned with each other, and formed with packing-faces B'. These sections are drawn together by bolts K, passed through the circulating-passages B and formed with shoulders $k$, bearing against the lower wall of the lower section A and the upper wall of the steam-drum F. As also best seen at Fig. 2, the outer periphery of the sections C, C', E, E', and F project beyond the outer periphery of the section A, and formed in said projecting portions of the sections C, C', E, E', and F, are flue-passages $b'$, whereby the products of combustion pass, as shown by the arrows, from the combustion-box D over the top of the section E' and down through the flue-passages $b$ into the annular space $b'$, inclosed between the adjacent peripheries of the heater-composing sections and their outer casing J. The passage $b$ in the steam-drum is closed by a cap $b^2$ and serves to admit a suitable cleaning-brush for removing the soot from the passages in the underlying sections. The inner periphery of the sections A, C, and C' is substantially smooth for forming the fire-box C, and projecting from the inner vertical wall or periphery of the overlying sections E E' are the water-heating chambers or corrugations $e$, which extend almost to the periphery of a suitable annular feeding-chute L and serve to greatly increase the heating capacity of the heater.

Figures 3, 4:
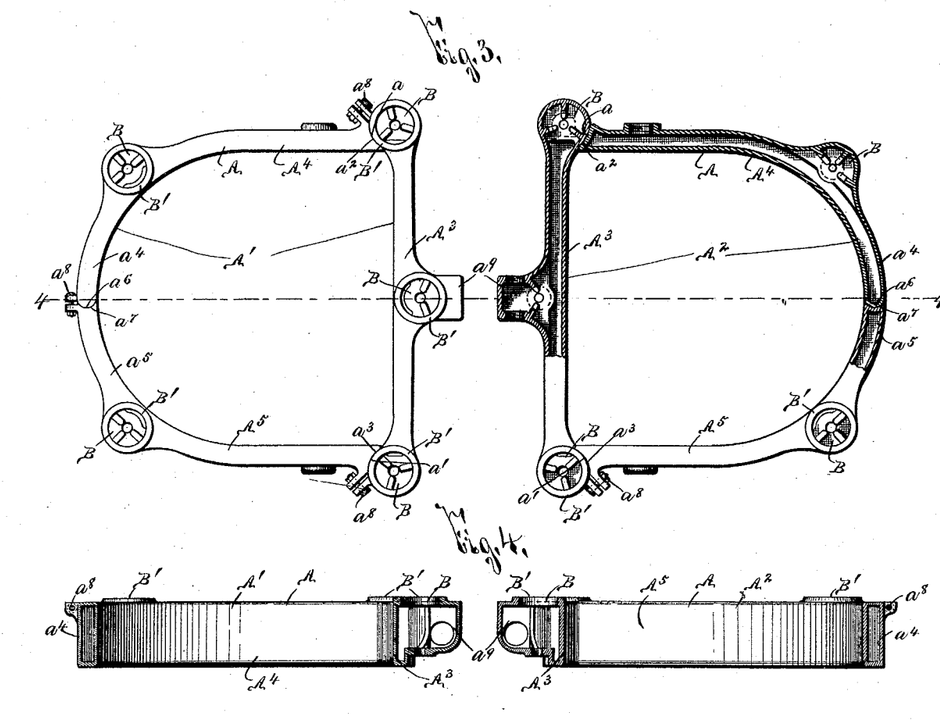
Fig. 3 is a top plan view, partly in section, of the water-containing section.
Fig. 4 is a longitudinal vertical sectional view taken on line 4 4, Fig. 3.
Figures 8, 9:
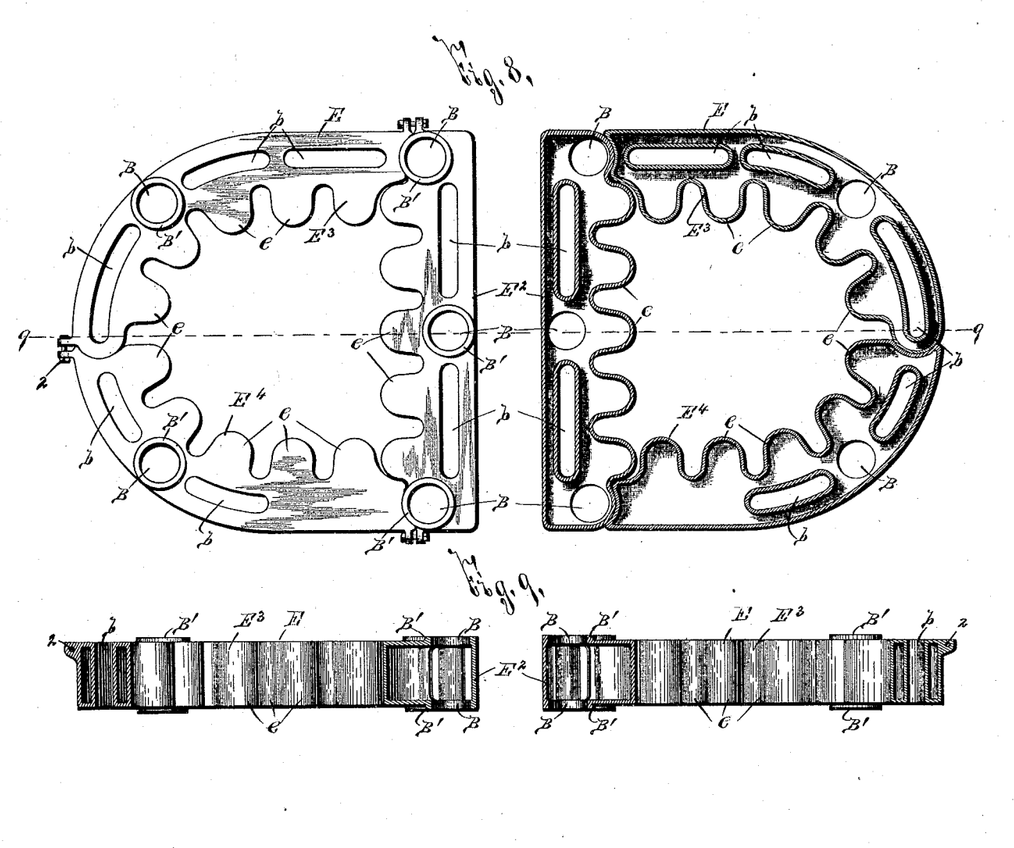
Fig. 8 is a top plan view, one-half being shown in section, of one of the sections imposed above the fire-box forming sections and provided with projecting heating-chambers for heating the water.
Fig. 9 is a longitudinal vertical sectional view taken on line 9 9, Fig. 8.

As best seen at Figs. 3, 4, and 5, the lower section A is composed of two like halves A' and A², each half being composed of separate divisions A³, A⁴, and A⁵. The opposite ends of the section A³ are formed with bearings $a$ and $a'$. The ends of the sections A⁴ and A⁵, adjacent to the bearings $a$ $a'$ are formed with corresponding bearings $a^2$ and $a^3$, lapping upon the bearings $a$ and $a'$, and their opposite extremities $a^4$ and $a^5$ are bent toward each other and are provided with the respective bearings $a^6$ and $a^7$, lapping upon each other. These bearings $a$ $a^2$, $a'$ $a^3$, and $a^6$ $a^7$ are lapped upon each other for the purpose of preventing the outlet of gases, are preferably formed of concavo-convex cross-section, and are drawn firmly against each other by suitable clamps $a^8$.

It will be particularly noted that, as shown at the right hand of Fig. 3, each of the separate divisions A³, A⁴, and A⁵ of the section-halves A' and A² are entirely separate from each other, being provided with intervening solid walls at their adjacent surfaces, so that, as thus far described, there is no circulation of water between said section-divisions.

M and M' represent separate systems of connecting-pipes communicating with the corresponding separate section-divisions A³, A⁴, and A⁵ for conducting the water to each division of both section-halves. These systems consist of the sections $m$ $m$ of the pipes $m'$, opening from the hollow lugs $a^9$ of the section-divisions A³ A³, the pipes $m^2$, opening from the sections A⁴ and connected to the pipes $m'$ by pipes $m^3$, and the pipes $m^4$, opening from the sections $A^5$ and connected to the pipes $m'$ by pipes $m^5$.

$M^2$ is a main connecting-pipe connected by elbows $m^6$ and sections of pipe $m^7$ to the point of union of the pipes $m^2$ $m^3$, whereby both systems of piping M and M' are connected together.

A T-union $M^3$ conveys cold water to the main connecting-pipe $M^2$, whence it passes to each of the section-divisions, thus equalizing the circulation of water therein. $M^4$ are valves in the elbows $m^6$, whereby the flow may be shut off from one or both of said section-halves A' and $A^2$.

The sections C, C', E, and E' directly above the section A are composed of separate halves formed of the separate divisions $C^2$ $C^3$ $C^4$ and $E^2$ $E^3$ $E^4$, adapted to be drawn together by suitable clamps.

It will be noted upon reference to the drawings that each of the section-divisions $A^3$, $C^2$, and $E^2$ are formed with three circulating-passages B, and each of the sections $A^4$ $C^3$ $E^3$ and $A^5$ $C^4$ $E^4$ with a single circulating-passage B. These upper divisions of the section-halves composing the sections C C' and E E' are entirely separated from each other, being unconnected by piping, as are the divisions of the lower section-halves A' $A^2$, and consequently three distinct upward currents rise through the corresponding divisions of said section-halves and pass into the section-divisions F', $F^2$, and $F^3$. In the divisions of this latter section the circulating-passages are somewhat differently arranged, the central division F' being provided with only one passage B and each of the divisions $F^2$ and $F^3$ with two, whereby the current from the ends of the section-divisions $A^3$, $C^2$, and $E^2$ passes to the ends of the divisions $F^2$ and $F^3$ instead of to the ends of the corresponding divisions F' F'.

Figures 9, 10:
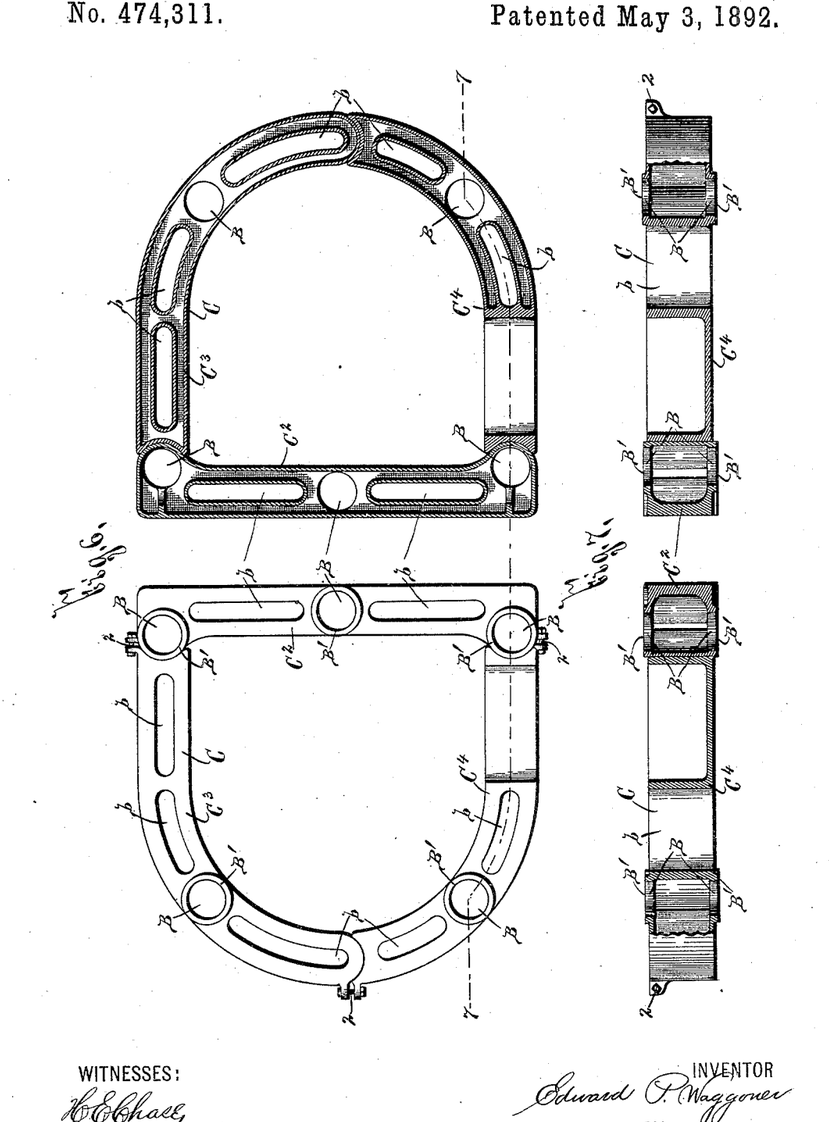
Fig. 10 is a top plan view, partly in section, of the section forming the steam-drum.
Figure 10:
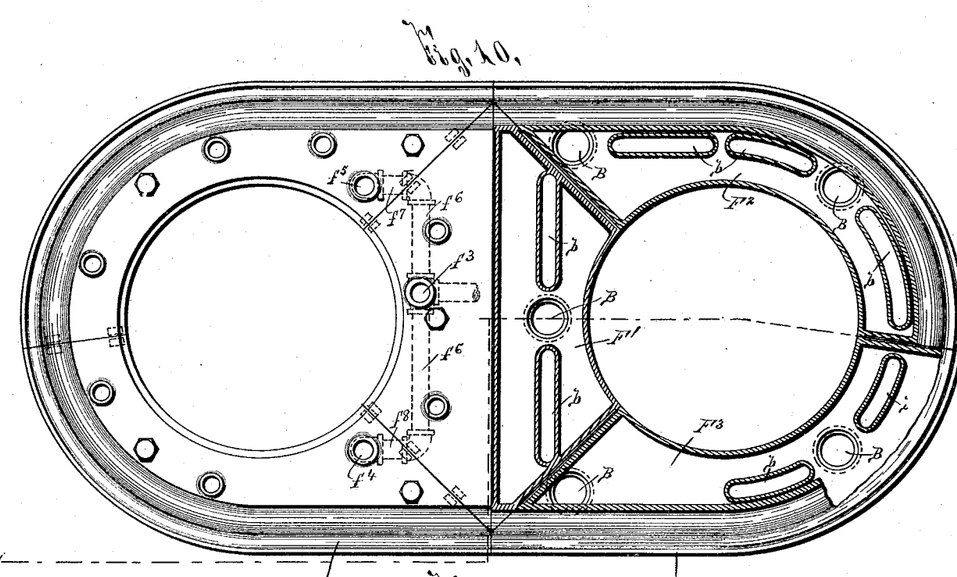
Figure 11:
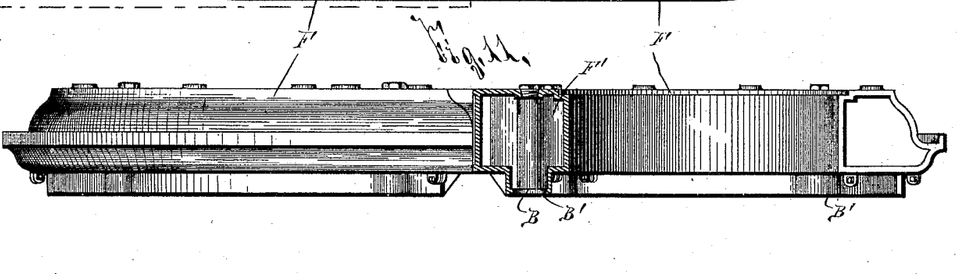
Fig. 11 is a vertical sectional view, partly in section, taken on line 11 11, Fig. 10.

$F^4$ and $F^5$ represent steam-connecting systems between the respective divisions of the steam-drum-section halves, and $F^6$ a main connecting-pipe between the separate systems $F^4$ and $F^5$, whereby the pressure of steam is equalized between the divisions of the separate steam-drum-section halves.

The systems $F^4$ and $F^5$ consist of the pipes $f, f'$, and $f^2$, leading from the respective openings $f^3, f^4$, and $f^5$ in the divisions F', $F^2$, and $F^3$ of the respective section-halves, and the pipes $f^6, f^7$, and $f^8$, connecting said pipes $f, f'$, and $f^2$. Valves $f^9$ and $f^9$ are provided at the opposite extremities of the main connecting-pipe $F^6$, and consequently the steam may be shut off from entrance into either half of the steam-drum section.

From an examination of this construction of heater it is obvious that a fire may be built above either or both of the grates I and that the entire heater may be used to generate the heat, or one-half may be shut off from operation by the valves $M^4$ and $f^9$, thus accommodating the heater to severe or mild weather.

The operation of my invention will be readily understood from the foregoing description and upon reference to the drawings, and it will be noted that the separate heater-sections are readily handled, shipped, and assembled with a minimum degree of labor and time, the flow of the water and the pressure of the steam equalized by the connecting-pipes between the divisions of the water-receiving section and steam-drum section, and that in its upward flow the water is subdivided into several ascending currents.

It is evident that the detail construction and arrangement of the parts of my invention may be somewhat changed from that shown and described, and consequently I do not herein limit myself to the precise construction and arrangement of the same.

Having thus fully described my invention, what I claim as new, and desire to secure by Letters Patent, is—

1. The herein-described section for sectional heaters, the same consisting of separate divisions arranged end to end and provided with separate interior chambers, and connecting-pipes between said divisions for equalizing the pressure therein, substantially as and for the purpose set forth.

2. The herein-described section for sectional heaters, the same consisting of separate divisions disposed in substantially the same plane and formed with separate interior chambers, clamps for drawing said divisions together, and connecting-pipes between the separate sections for connecting one with the other and equalizing the pressure in the separate chambers, substantially as and for the purpose specified.

3. The herein-described heater, the same comprising a lower section composed of separate divisions arranged end to end and provided with separate interior chambers, connecting-pipes between said divisions for connecting one with the other, a steam-drum above the lower section, also composed of separate divisions, and connected with the lower section, whereby a circulation is produced between the two, and connecting-pipes between the divisions of the steam-drum for equalizing the pressure therein, substantially as and for the purpose set forth.

4. In a heater, the combination of a lower section composed of separate divisions formed with circulating-passages, connecting-pipes between the respective divisions for connecting one with the other, an upper section composed of separate divisions, having circulating-passages communicating with the former passages for producing a circulation between the lower and upper sections, projecting chambers on the divisions of the upper section extending beyond the side wall of the lower section for heating the water therein, a steam-drum composed of separate sections, having circulating-passages communicating with the former passages of the underlying sections, and connecting-pipes between the respective divisions of the steam-drum for equalizing the pressure therein, substantially as and for the purpose specified.

5. The herein-described section for sectional heaters, the same consisting of separate divisions, rounding bearings on the adjacent portions of the separate divisions, clamps for drawing said divisions together, and connecting-pipes between the respective divisions of the sections, substantially as and for the purpose set forth.

6. In a section for sectional heaters, the combination of the division $A^3$, having bearings at its opposite extremities, a division $A^4$, having a bearing at one extremity lapping upon one of the bearings of the former division and having the bent extremity $a^4$, provided with a bearing-face, the division $A^5$, having one end lapping with the bearing on the opposite extremity of the division $A^3$ and having its opposite end $a^5$ bent toward the bent extremity of the division $A^4$ and formed with a bearing lapping upon the corresponding bearing on the division $A^4$, clamps for drawing said divisions together, and connecting-pipes between the respective divisions for equalizing the pressure therein, substantially as and for the purpose specified.

7. In a duplex heater, the combination of two separate section-halves composing a section, separate divisions composing each section-half, connecting-pipes between the divisions of the respective section-halves for connecting one division thereof with the other, and a main connecting-pipe between the former pipes for equalizing the pressure in the separate section-halves, substantially as and for the purpose set forth.

8. In a duplex heater, the combination of the separate lower section-halves lying at one side of each other, separate divisions composing said section-halves, having circulating-passages, connecting-pipes between the separate divisions for connecting one with the other, a main connecting-pipe between the former pipes for connecting the respective section-halves with each other, steam-drum-section halves lying at one side of each other, separate divisions composing the steam-drum-section halves, having circulating-passages communicating with the like passages of the underlying sections, connecting-pipes between the separate divisions of the steam-drum, and a main connecting-pipe between the connecting-pipes of the separate divisions of the steam-drum sections, substantially as and for the purpose set forth.

In testimony whereof I have hereunto signed my name, in the presence of two attesting witnesses, at Syracuse, in the county of Onondaga, in the State of New York, this 1st day of October, 1891.

EDWARD P. WAGGONER.

Witnesses:
CLARK H. NORTON,
L. M. BAXTER.